Sept. 14, 1948.   L. K. PERRY   2,449,177
TILT-ACTUATED SWITCH

Filed April 23, 1946   2 Sheets-Sheet 1

INVENTOR.
LESLIE K. PERRY
BY
Frederick Diehl
ATTORNEY

Sept. 14, 1948.  L. K. PERRY  2,449,177
TILT-ACTUATED SWITCH
Filed April 23, 1946  2 Sheets-Sheet 2
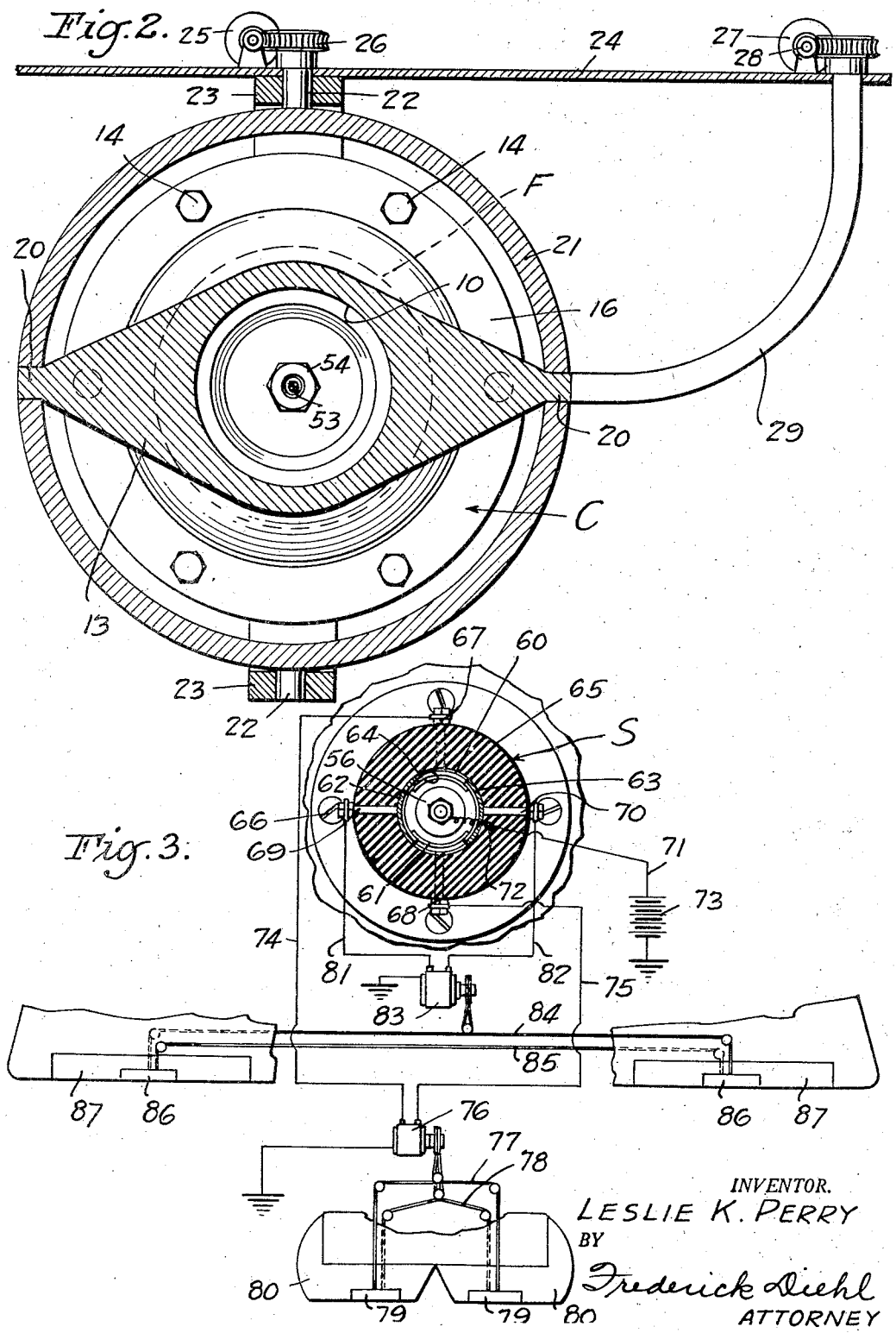
INVENTOR.
LESLIE K. PERRY
BY
Frederick Diehl
ATTORNEY Patented Sept. 14, 1948

2,449,177

UNITED STATES PATENT OFFICE 2,449,177

TILT-ACTUATED SWITCH

Leslie K. Perry, Los Angeles, Calif.

Application April 23, 1946, Serial No. 664,247

6 Claims. (Cl. 200—52)

1

This invention relates generally to the art of navigation, and more particularly to apparatus for automatically actuating flying controls of an aircraft to maintain a predetermined flight course.

An object of this invention is to provide an instrument of the above described character, which is distinguished by its simplicity and compactness of construction, is relatively inexpensive to manufacture so as to enable it to be installed in smaller planes at a comparatively low cost, and which, in its installed position, is adapted to control power-actuated flying control surfaces such as the trim tabs of the ailerons and elevators of the aircraft in a manner for the latter to maintain level flight by the automatic correction of any deviation therefrom both longitudinally and laterally of the aircraft.

Another object of this invention is to provide an automatic pilot which includes a gravity-controlled float device operating in a body of liquid and operatively associated in its preferred embodiment with switch mechanisms of servo-motors for the aileron and elevator trim tabs in such manner as to effect the necessary actuation of the tabs to correct any deviation of the aircraft from level flight.

With these and other objects in view, the invention resides in the combinations, arrangements and functional relationships of elements as set forth in the following specification and particularly pointed out in the appended claims.

In the accompanying drawings,

Figure 2 is a horizontal sectional view taken on the line 2—2 of Figure 1, and looking in the direction of the arrows; and Figure 3 is a fragmentary horizontal sectional view of the switch mechanism, taken on the line 3—3 of Figure 1 and diagrammatically including the ailerons and elevators with the servo-motors and electrical circuits therefor, by which the trim tabs are actuated.

Figure 1:
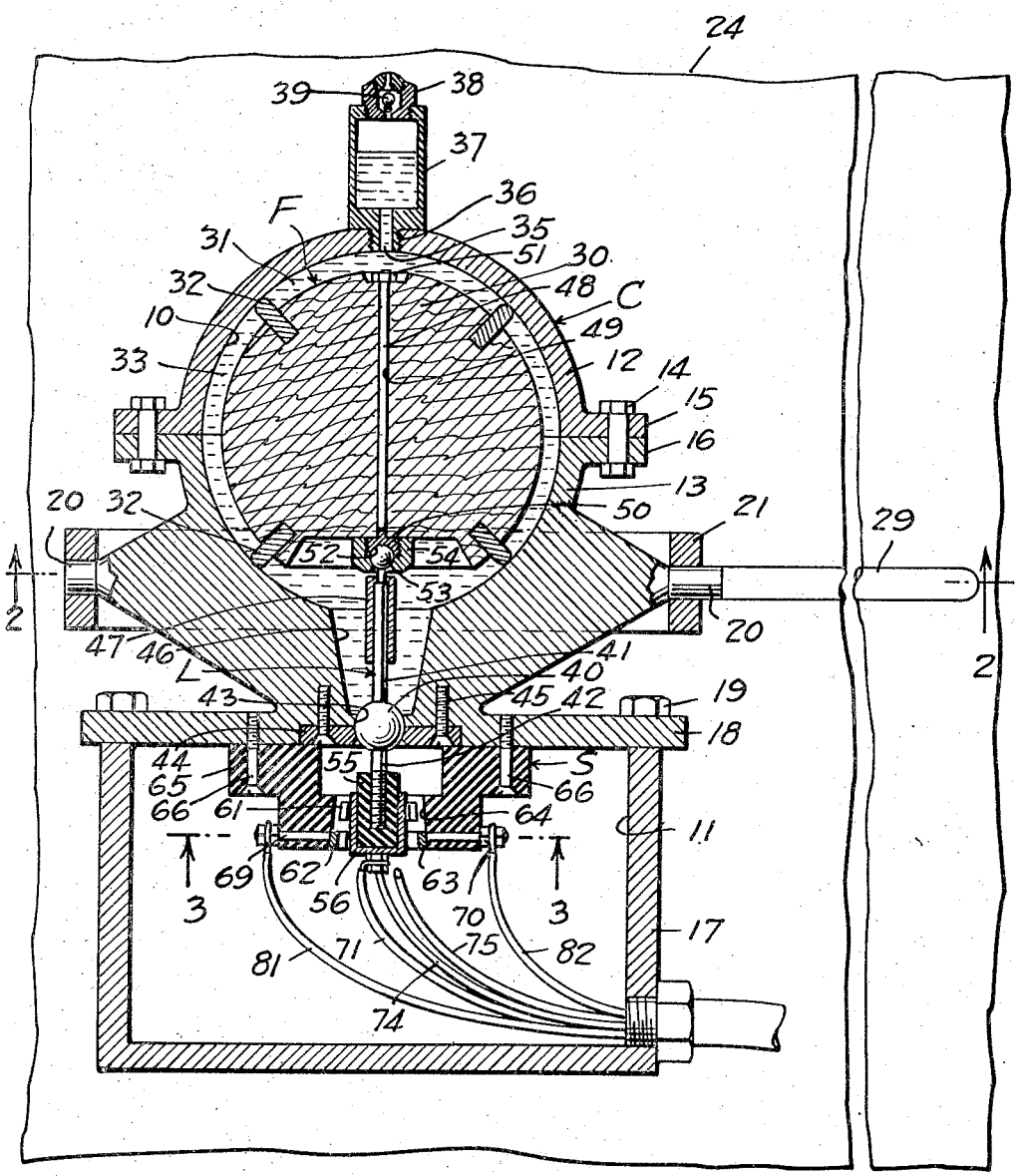
Figure 1 is a view showing in vertical axial section, one form of automatic pilot embodying this invention.

Referring specifically to the drawings, the invention in its illustrated embodiment comprises a case designated generally at C and composed of a float chamber 10 and a switch compartment 11. The float chamber is spherical and is divided diametrically into two semi-spherical portions 12 and 13 secured together by bolts 14 (Figure 1) passing through mating peripheral flanges 15 and 16 to clamp the portions together with a fluid-tight joint therebetween. The switch compart-

2 ment 11 is formed by a cup-shaped portion 17 of the case C, the open side of which is closed by a cover 18 carried by the portion 13 of the case and secured to the portion 17 by bolts 19.

The portion 13 of the case C is provided with trunnions 20 mounted in a gimbal ring 21, which, at ninety degrees from the trunnions 20, is provided with trunnions 22 mounted in a vertical frame 23 fixed to the back of the instrument panel of the aircraft designated at 24, so as to support the case therefrom. One of the trunnions 22 is operatively connected to an adjusting knob 25 through an irreversible worm and worm wheel drive 26, whereas one of the trunnions 20 is operatively connected to a similar adjusting knob 27 through an irreversible worm and worm wheel drive 28 and a flexible shaft 29, all to the end of facilitating adjustment of the case C to permanently occupy a predetermined fixed position relative to the aircraft when the instrument is installed therein.

A float designated generally at F comprises a spherical body 30 of balsa or other light wood or fluid-tight hollow sheet metal of an outside diameter somewhat less than the diameter of the chamber 10, to provide a fluid space 31 therebetween. At equally spaced intervals around the periphery of the body 30 are bearing projections 32 semi-spherical at their outer ends and adapted to freely contact the wall of the chamber with minimum friction which is rendered negligible by filling all otherwise unoccupied space in the chamber with a liquid substance such as mercury or hydraulic brake fluid, to the end that the coefficient of friction between the float and wall of the chamber will be extremely small. The float F may be coated with a suitable liquid-proof paint to render the float impervious to the liquid being used in the chamber.

At its highest point, the chamber 10 is provided with an inlet opening 35 into which is screwed a nipple 36 projecting from the bottom of an expansion chamber 37 to support same on the portion 12 of the case C as shown in Figure 1. The expansion chamber 37 is provided with a removable filling plug 38 containing a suitable ball check valve 39 which prevents loss of liquid, yet permits circulation of air in order to prevent pressure from being built up in the float chamber 10.

The float F is operatively connected to a switch mechanism S in the compartment 11 by a motion transferring element in the form of a shaft L which provides a lever of the first class consisting of a fulcrum ball 40 and co-axially related cylindrical arms 41 and 42. The ball 40 is mounted in a socket bearing 43, one portion of which is formed in the flange 18 of the case part 13, and the other portion in a plate 44 secured in a counterbore in the flange 18 by screws 45, so as to mount the shaft L with its arm 41 projecting through a flaring bore 46 into the chamber 10, and its arm 42 projecting into the compartment 11.

The arm 41 is telescopically received in one end of a connector sleeve 47 a rod 48 extends through a diametric bore 49 in the float body, and is provided at one end with a head 50, and at its other end is threaded to receive a nut 51 to rigidly secure the rod against displacement. The head 50 is formed with a seat 52 for a ball 53 carried by said other end of the connector sleeve 47, said ball being confined against the seat 52 by a nut 54 threaded on the head, all as clearly shown in Figure 1, and to provide a combined three hundred-sixty degree swiveling connection and an axially extensible connection between the float F and lever L.

The arm 42 of the lever L is threaded to rigidly mount thereon the electrical insulating body 55 of an annular contact element which constitutes the main contact 56 of the switch S, and is adapted for engagement with motor contacts 60, 61, 62 and 63 of segmental form and grouped in a circular series around the contact 56 at ninety degree angular distances apart, with the two opposed forward and reverse motor contacts 60 and 61 being laterally offset from the other two opposed forward and reverse motor contacts 62 and 63, to permit the end portions of the contacts to be in circumferentially overlapped and insulated relation. The several contacts 60, 61, 62 and 63 are fixed in the slightly tapered bore 64 of a support 65 of insulating material secured in the switch compartment 11 to the flange 18 of the case C by screws 66. As shown in Figure 1, the contacts 60, 61, 62 and 63 are secured to binding posts 67, 68, 69 and 70 respectively, whereas the main contact 56 is connected directly by a conductor 71 and a flexible lead wire 72 to a grounded source of current supply 73.

Conductors 74 and 75 connect the binding posts 67 and 68 of the respective contacts 60 and 61 to a reversible electric motor 76, which, through cable and pulley connections 77 and 78 to the trim tabs 79 of the elevators 80 of the aircraft, is adapted to raise or depress the tabs according as upward or downward correction in a fore and aft direction is needed to maintain level flight. Conductors 81 and 82 connect the binding posts 69 and 70 of the respective contacts 62 and 63 to a reversible electric motor 83, which, through cable and pulley connections 84 and 85 to the trim tabs 86 of the ailerons 87 of the aircraft, is adapted to reversely actuate the ailerons in one direction or the other according as right or left hand banking correction is required to maintain level flight, all as diagrammatically shown in Figure 3.

The operation of the invention is as follows:

The instrument is installed on the instrument panel 24 of the aircraft, and the case C adjusted in its mounting to dispose the main contact 56 centrally within and equally spaced radially from the motor contacts 60, 61, 62 and 63 with the aircraft occupying a position corresponding to that of level flight in fore and aft and lateral directions.

With the aircraft in flight, any deviation of the craft from a level position will correspondingly tilt the case C in a fore and aft and/or lateral direction, whereas the float F will, by the action of gravity and the negligible friction between the float and case, tend to maintain a fixed relation to the earth, so that a predetermined angular movement of the case relative to the float will react through the lever L to engage the contact 56 with a contact 60, 61, 62 or 63.

For example, should the aircraft assume a diving angle, the resulting forward tilting of the case C from its normal perpendicular position shown in Figure 1, will cause the contact 60 and contact 56 to engage and thus supply current to the motor 76 to drive same in such direction as will actuate the elevator trim tabs 79 to restore the aircraft to a level position, by completing an electrical circuit as follows:

From battery 73, conductors 71, 72 to contact 56, contact 60, binding post 67, conductor 74 and motor 76 to the grounded side of the battery 73.

Should the aircraft assume a climbing angle, the resulting fore and aft tilting of the case C will engage the opposite contact 61 and the contact 56 to supply current to the motor 76 to drive same in the reverse direction so as to reversely actuate the trim tabs 79 to restore the aircraft to level position, by completing an electrical circuit as follows:

From battery 73, conductors 71, 72 to contact 56, contact 61, binding post 68, conductor 75 and motor 76 to the grounded side of the battery 73.

Should the aircraft assume a right or left hand banking angle, the contact 56 will accordingly engage the contact 62 or 63 to complete a circuit including the motor 83 through either the conductor 81 or the conductor 82 so as to drive the motor 83 in one direction or the other and accordingly actuate the trim tabs 86 of the ailerons 87 in the directions necessary to restore the aircraft to an even keel.

Should the aircraft assume a combined fore and aft and banking attitude, one of the contacts 60, 61 and one of the contacts 62, 63 will engage the contact 56 so as to drive both motors 76 and 83 in the proper directions for the trim tabs 79 and 86 to be actuated in directions for them to co-act in restoring the aircraft to an even keel.

From the foregoing description, it will be manifest that any deviation of the aircraft from substantially level flight will be automatically corrected so as to greatly simplify the control of the aircraft by relieving the pilot of manual actuation of the controls, as well as the constant attention otherwise necessary to maintain the craft on an even keel. By locking the rudder of the craft in a precalculated position to fly a desired compass course, the duties of the pilot in controlling the flying control surfaces of the craft can be reduced to a minimum.

I claim:

1. In an instrument of the class described, means defining a chamber containing a liquid and adapted to be fixed to an aircraft; a buoyant body rotatable in said liquid and guided by the chamber wall with negligible friction; switch mechanism composed of a main contact and a plurality of motor contacts; means mounting said motor contacts in a circular series around the main contact, for unitary movement with the first means as the aircraft assumes various attitudes when in flight; a motion transferring element having a connecting portion and a portion carrying said main contact; means co-acting with said element to mount same for tilting movements in any direction about a fixed center on the first said means; and means co-acting with said connecting portion of said element and said body, to operatively connect them for tilting movement of the element to engage said main contact with a predetermined one of said motor contacts in accordance with the direction of the aforestated movement of the first said means.

2. In an instrument of the class described, a case having a chamber containing a liquid, and adapted to be fixed to an aircraft for movement therewith in assuming various attitudes when in flight; a buoyant body rotatable in said liquid; a plurality of segmental shaped motor contacts insulated from each other and supported in a circular series by the case, with the ends of adjacent contacts in circumferentially overlapped relation; a main contact; a motion transferring element having a connecting portion and a portion carrying said main contacts; means co-acting with said element to mount same for angular movement about a fixed center on the case; and means co-acting with said connecting portion of the element and said body, to operatively connect them for angular movement of the element to engage said main contact with a predetermined one of said motor contacts or with two thereof at their overlapped ends, in accordance with the direction of the aforestated movement of the case.

3. In an instrument of the class described, a case having a chamber containing a liquid, and adapted to be fixed to an aircraft for movement therewith in assuming various attitudes when in flight; a buoyant body rotatable in said liquid; a main contact; a lever having an arm supporting said main contact; means mounting the lever for universal angular movement about a fixed fulcrum on the case; a plurality of motor contacts supported by the case in a circular series about the main contact; and means operatively connecting the lever to the buoyant body to effect angular movement of the main contact about said fulcrum in a predetermined direction in accordance with the direction of the aforestated movement of the case, for engagement of the main contact and a predetermined motor contact.

4. In an instrument of the class described, a case having a chamber containing a liquid, and adapted to be fixed to an aircraft for movement therewith in assuming various attitudes when in flight; a buoyant body rotatable in said liquid; a main contact; a lever having an arm supporting said main contact; means mounting the lever for universal angular movement about a fixed fulcrum on the case; a plurality of motor contacts supported by the case in a circular series about the main contact; a connector having an axially extensible operative connection to a second arm of said lever; and a universal joint connection between said connector and said buoyant body for actuation of the lever in a predetermined direction about said fulcrum, in accordance with the direction of the aforestated movement of the case.

5. In an instrument of the class described, a case having a chamber containing a liquid, and adapted to be fixed to an aircraft for unitary movement therewith in assuming various attitudes when in flight; a buoyant body rotatable in said liquid; a lever of the first class having a ball fulcrum mounted in said case below the chamber and having one arm projecting upwardly into the chamber; a main contact carried by the other arm of the lever below and exteriorly of the chamber; a plurality of motor contacts supported by the case in a circular series about the main contact for respective engagement therewith in response to movement of the lever about its fulcrum; and means operatively connecting said one arm of said lever to the buoyant body to actuate said lever and engage said main contact with one of said motor contacts in accordance with the direction of the aforestated movements of the case.

6. In an instrument of the class described, a case having a chamber containing a liquid, and adapted to be fixed to an aircraft for unitary movement therewith in assuming various attitudes when in flight; a buoyant body in said liquid; a lever of the first class having a ball fulcrum mounted in said case below the chamber and having one arm projecting upwardly into the chamber; a main contact carried by the other arm below and exteriorly of the chamber; a plurality of motor contacts supported by the case in a circular series about the main contact for respective engagement therewith in response to movement of the lever about its fulcrum; a connector sleeve telescopically receiving said one arm of the lever; and a ball and socket joint connecting said sleeve to the buoyant body for actuation of the lever in response to the aforestated movements of the case.

LESLIE K. PERRY.

REFERENCES CITED

The following references are of record in the file of this patent:

UNITED STATES PATENTS

| Number | Name | Date |
|---|---|---|
| 1,203,221 | Macy | Oct. 31, 1916 |
| 1,274,333 | Roland | July 30, 1918 |
| 1,286,860 | White | Dec. 3, 1918 |
| 1,565,763 | Vickers | Dec. 15, 1925 |
| 1,579,370 | Krammer | Apr. 6, 1926 |
| 1,826,013 | Meredith | Oct. 6, 1931 |
| 1,859,752 | Sperry | May 24, 1932 |
| 1,881,137 | Schneider | Oct. 4, 1932 |
| 2,278,015 | Openshaw | Mar. 31, 1942 |